United States Patent
Wood et al.

(10) Patent No.: US 8,336,775 B2
(45) Date of Patent: Dec. 25, 2012

(54) AEROSPACE-GROUND INTEGRATION TESTBED

(75) Inventors: Joanne E. Wood, Plano, TX (US);
Rickford B. Still, Van Alstyne, TX (US);
Janet L. H. Housley, Allen, TX (US);
Russell W. Lai, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 92 days.

(21) Appl. No.: 12/821,035

(22) Filed: Jun. 22, 2010

(65) Prior Publication Data

US 2011/0309143 A1 Dec. 22, 2011

(51) Int. Cl.
*G06F 19/00* (2011.01)
(52) U.S. Cl. .......................... 235/400; 235/401
(58) Field of Classification Search ........... 235/400–418
See application file for complete search history.

(56) References Cited

U.S. PATENT DOCUMENTS

2005/0267731 A1* 12/2005 Hatcherson et al. ............ 703/26

* cited by examiner

*Primary Examiner* — Michael G Lee
*Assistant Examiner* — Matthew Mikels
(74) *Attorney, Agent, or Firm* — Christie, Parker & Hale, LLP (57) ABSTRACT

An aerospace-ground integration testbed may include a truth data scheme, a common sensor adaptor, a common sensor framework, a visualization scheme and a communications scheme. The truth data scheme may generate truth data configured to provide data of at least one of threats, terrain, targets and offensive and defensive systems. The common sensor adaptor may provide sensed data generated from at least the truth data. The common sensor framework may provide modeled sensed data generated from at least the truth data utilizing sensor models. The visualization scheme may generate visual data to be displayed from the sensed data and the modeled sensed data. The communications scheme may provide communication and testbed messaging infrastructure between the truth data scheme, the common sensor adaptor, the common sensor framework, and the visualization scheme.

10 Claims, 5 Drawing Sheets

AEROSPACE-GROUND INTEGRATION TESTBED

BACKGROUND

1. Field of the Invention

The present invention relates to an aerospace-ground integration testbed.

2. Description of Related Art

With the advent of highly complex tactical scenarios involving new warfighter capabilities for maimed and unmanned systems operating in air, ground, sea and space, predictability of end-to-end mission analysis has become increasingly important.

Conventional testbeds have been developed to integrate and test tactical and non-tactical hardware and/or software to evaluate their merits. Such testbeds may include one or more desktop workstations, servers and connectivity schemes. The workstations and/or servers may operate within the Linux, Solaris, Windows or other environments.

These conventional systems generally have limited capacity to provide end-to-end mission analysis for highly complex tactical scenarios, given the increased reliance on high-fidelity sensors, effectors and maimed and unmanned systems to provide data and other tactical capabilities to and from the warfighter. In addition, it is generally difficult to provide accurate performance predictions for near term and next generation systems with conventional testbeds.

SUMMARY OF THE INVENTION

Exemplary embodiments according to the present invention provide an aerospace-ground integration testbed including an integrated collection of hardware, high-fidelity system and subsystem software models, and manned and unmanned systems, which provides system-of-systems trade studies, mission effectiveness figures of merit, Man-in-the-Loop experiments, benchmarking, performance predictions, real-time test activities and Monte Carlo analyses.

According to an exemplary embodiment in accordance with the present invention, there is provided an aerospace-ground integration testbed that includes a truth data scheme, a common sensor adaptor, a common sensor framework, a visualization scheme and a communications scheme. The truth data scheme generates truth data configured to provide data of at least one of threats, terrain, targets and offensive and defensive systems. The common sensor adaptor provides sensed data generated from at least the truth data utilizing tactical sensor software. The common sensor framework provides modeled sensed data generated from at least the truth data utilizing sensor models. The visualization scheme generates visual data to be displayed from the sensed data and the modeled sensed data. The communications scheme provides communication and testbed messaging infrastructure between the common sensor adaptor, the common sensor framework, the truth data scheme, and the visualization scheme.

The aerospace-ground integration testbed may further include a human-machine interface configured to receive data and transmit mission-level commands via the communications scheme.

The aerospace-ground integration testbed may further include a database for storing passive data configured to be used to generate at least one of the sensed data, the modeled sensed data, the truth data, and the visual data.

The aerospace-ground integration testbed may further include an advanced mission control element for receiving the sensed data and the modeled sensed data and generating autonomous platform data and dynamic platform behaviors.

The advance mission control element may include a sensor management scheme for commanding sensor operations of the platform(s), a mission management scheme for executing operations corresponding to automated and autonomous functions of the platform(s), an effects management scheme for providing launch and control commands to weapons and effector systems of the platform(s), a vehicle management scheme for providing vehicle control commands to vehicle control systems of the platform(s), a situational awareness management scheme for providing correlation of sensor data of the platform(s), a communications management scheme for providing coordination, command and control between the advanced mission control element, the platform(s), and systems external to both the advanced mission control element and the platform(s), an information management scheme for generating and distributing information pertaining to the autonomous platform data and intelligence of the advanced mission control element and the platform(s), and a middleware scheme for interfacing the sensor management scheme, the mission management scheme, the effects management scheme, the vehicle management scheme, the situational awareness management scheme, the communications management scheme, and the information management scheme.

According to another exemplary embodiment in accordance with the present invention, there is provided a method of generating a system of systems set of measure of performance and predictive data utilizing an aerospace-ground integration testbed, wherein the method includes generating truth data for providing data of at least one of threats, terrain, targets and offensive and defensive systems, interfacing a tactical simulator with the aerospace-ground integration testbed, the tactical simulator for providing sensed data generated from at least the truth data, generating modeled sensed data from at least the truth data, generating unmanned and autonomous vehicle data from at least one of the sensed data and the modeled sensed data, and generating visual data to be displayed from at least one of the sensed data and the modeled sensed data for outputting the system of systems measure of performance and the predictive data.

The method may further include receiving commands from a command station, and in accordance with the received commands, adapt, re-task and re-plan a pre-planned mission plan, wherein the unmanned and autonomous vehicle data is generated in accordance with the pre-planned mission plan and the received commands.

According to another exemplary embodiment in accordance with the present invention, there is provided an aerospace-ground integration testbed for generating and displaying tactical information, including a database for storing passive data pertaining to an environment, a first plurality of modules for generating truth data from the passive data, and a second plurality of modules for receiving the truth data and generating sensed data from the truth data, wherein the sensed data is configured to be used, in conjunction with other data, to generate and display tactical information.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

Accordingly, there is presented an aerospace-ground integration testbed including an integrated collection of hardware, high-fidelity system and subsystem software models, and manned and unmanned systems, which provides system-of-systems trade studies, mission effectiveness figures of merit, Man-in-the-Loop experiments, benchmarking, performance predictions, real-time test activities and Monte Carlo analyses.

The aerospace-ground integration testbed is configured to provide a hardware-agnostic environment in which to test or measure the merits of system-of-systems configurations and/or methods of providing predictive data outputs. For example, the aerospace-ground integration testbed provides non-processed or "passive" data to be processed to provide truth data or "active" data. Passive data may include background environmental characteristics from known or generated databases, such as governmental databases of road, terrain, elevation and other known data. Active data may include hostile, neutral and/or allied (e.g., red, white and/or blue) target entity models, and weapons and/or effectors models. Using the active data (and in some cases, the passive data), real and/or modeled sensors generate actual and/or modeled sensed data. Such sensed data or perceived data (e.g., sensing data already processed as truth data) may be used and/or further processed to be displayed to an end user. The end user may conduct system-of-systems trade studies, generate mission effectiveness figures of merit, benchmarking, performance predictions, real-time test activities, and Monte-Carlo analyses. The end user may also input mission-level commands (or otherwise input lower-level commands) to the aerospace-ground integration testbed to conduct Man-in-the-Loop experiments.

Figure 1:
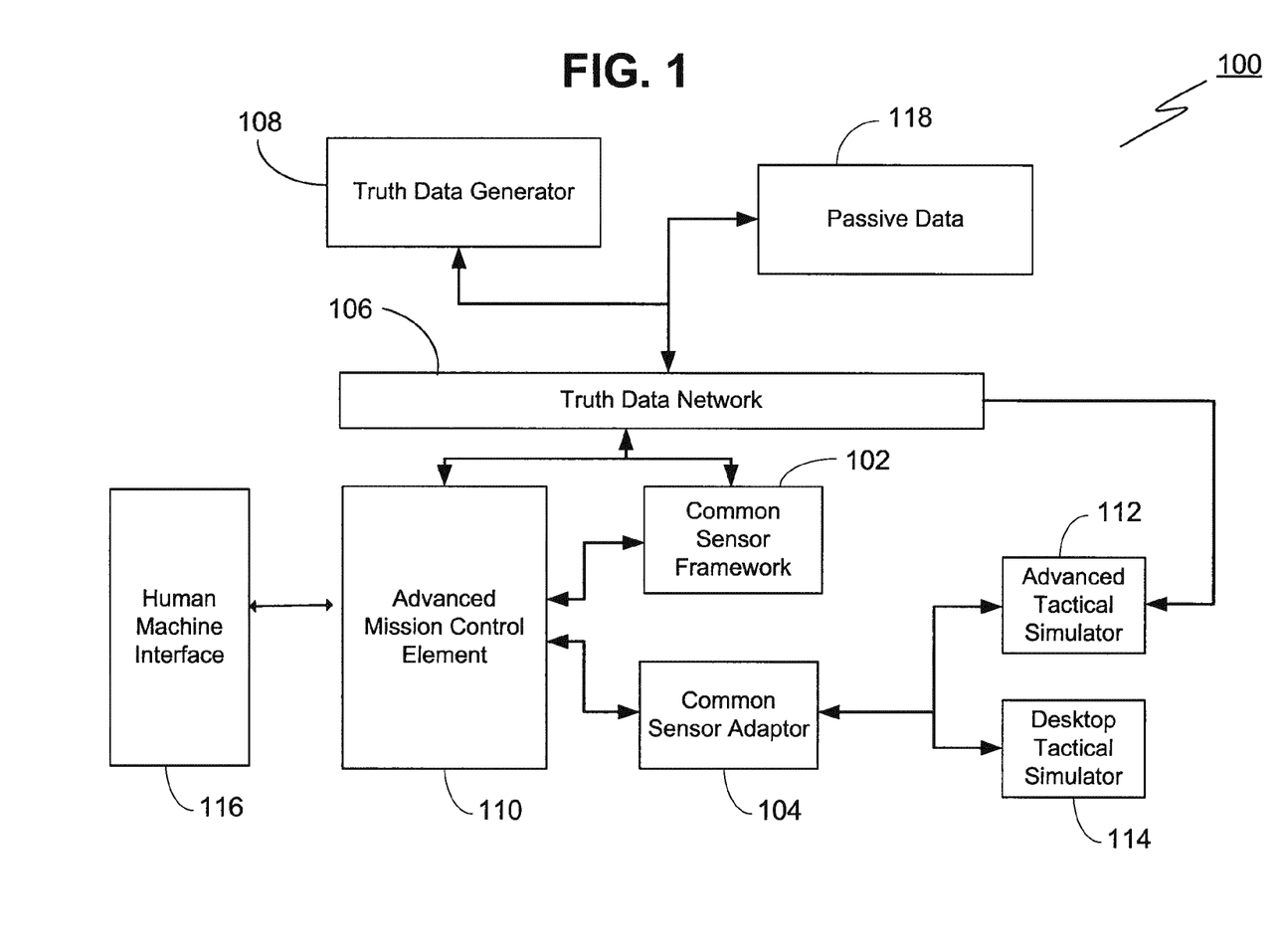
FIG. 1 is a schematic block diagram illustrating an aerospace-ground integration testbed in accordance with an embodiment of the present invention.

FIG. 1 is a schematic block diagram illustrating an aerospace-ground integration testbed in accordance with an embodiment of the present invention.

Referring now to FIG. 1, an aerospace-ground integration testbed 100 in one embodiment includes a common sensor framework (CSF) 102, a common sensor adaptor (CSA) 104, a truth data network 106, a truth data generator 108, an advanced mission control element (AMCE) 110, an advanced tactical simulator (ATS) 112, a desktop tactical simulator (DTS) 114, a human-machine interface (HMI) 116, and passive database 118.

In the embodiment according to FIG. 1, the CSF 102 is coupled to the truth data network 106, and the AMCE 110. Through the truth data network 106, the CSF 102 may communicate with the truth data generator 108, and the passive database 118. The CSF 102, for example, is configured to provide modeled sensed data generated from at least truth data utilizing sensor models. As depicted in FIG. 1, the CSF 102 is configured to receive truth data from the truth data generator 108 through the truth data network 106. The CSF 102 uses the truth data, in addition to other data, as input data to provide the modeled sensed data. For example, as explained in greater detail below, the CSF 102 may also receive background sensor data, inertial navigation system (INS) data, sensor commands from the AMCE 110. The CSF 102 includes software that is configured to model multiple instantiations of synthetic sensors. For example, the CSF 102 is configured to model high, medium and low fidelity aspects of a "generic" sensor, such that any known or future sensor is capable of being modeled. Such sensors include radar, electro-optical (E/O) and infrared (IR) sensors, for example. The CSF 102 is also configured to be modified so that high-fidelity characteristics of a sensor, such as digital signal processing or other engineering-level aspects may be modified.

In the embodiment according to FIG. 1, the CSA 104 is coupled to the AMCE 110, the ATS 112, and the DTS 114. The GSA 104 is configured to interface and adapt tactical software models and/or tactical software/hardware configurations to conduct "software in the loop" testing and/or modeling (e.g., provides sensed data generated from at least truth data). Known tactical software such as tactical software for high-fidelity aircraft radar may be adapted to run in the system-of-systems environment. As depicted in FIG. 1, the CSA 104 is configured to interface the ATS 112 and/or the DTS 114 with the AMCE 110. The GSA 104, in part, allows the aerospace-ground integration testbed 100 to be hardware-agnostic, meaning that many varieties of hardware and electronics may be integrated using the same interface or adaptor without requiring significant changes to existing hardware or other testbeds. The CSA 104 is configured to integrate high, medium and low fidelity software and/or software/hardware combinations. Such software and/or software/hardware combinations may include tactical or non-tactical radar, EO and IR sensor models or systems, for example. In an aspect, the GSA 104 includes code modifications for each sensor, such that each sensor has a unique CSA module.

The CSF 102 may use the truth data, in addition to other data, to provide the modeled sensed data. For example, as explained in greater detail below, the CSF 102 may also receive background sensor data, inertial navigation system (INS) data, sensor commands from the AMCE 110. The CSF 102 includes software that allows multiple instantiations of synthetic sensors. For example, the CSF 102 is configured to model high, medium and low fidelity aspects of a "generic" sensor, such that any known or future sensor is capable of being modeled. Such sensors include radar, EO and IR sensors, for example. The CSF 102 is also configured to be modified so that high-fidelity characteristics of a sensor, such as digital signal processing or other engineering-level aspects may be modified or changed depending on the type of test to conduct.

In the embodiment according to FIG. 1, the truth data network 106 is coupled to the CSF 102, truth data generator 108, AMCE 110, ATS 112 and passive database 118. For example, the truth data network 106 is a high level architecture (HLA) truth data network. An HLA network is a general purpose architecture for distributed computer simulation systems, intended to provide communication between computer simulations regardless of the computing platforms. In this embodiment, the HLA network generally requires run-time infrastructure (RTI) middleware that is configured to federate the various computer simulations.

In the embodiment according to FIG. 1, the truth data generator 108 (e.g., truth data scheme) is coupled to the truth data network 106 that provides communication between the truth data generator 108 and the CSF 102 and AMCE 110. The truth data generator 108 and the truth data network 106 are also coupled to the passive database 118. The truth data generator 108 is configured to generate truth data, including hostile, neutral and/or allied (e.g., red, white and/or blue) target entity models, and weapons and/or effectors models. In an aspect, the truth data includes at least one sensor model (e.g., producing and/or generating modeled sensed data). In other words, the truth data may include modeled data produced similarly to the modeled sensed data provided by the CSA 104 (i.e., generated in cooperation with the ATS 112 and/or DTS 116) and/or produced by the CSF 102. One of ordinary skill in the art would understand that there may be advantages to providing modeled sensed data as truth data rather than producing and/or generating modeled sensed data outside of the truth data generator 108 (but using truth data generated from the truth data generator 108). This will be discussed in greater detail below with reference to FIG. 2.

In the embodiment according to FIG. 1, the AMCE 110 is coupled to the CSF 102, the CSA 104, the truth data network 106 and the HMI 116. Through the truth data network 106, the AMCE 110 may communicate with the truth data generator 108 and the passive database 118. The AMCE 110 is configured to receive data (e.g., real and/or modeled sensed data) and generate autonomous platform data. For example, the autonomous platform data may include dynamic vehicle behaviors and commands sent to the vehicle controller of an unmanned airborne vehicle in response to a pop-up enemy missile system threat. U.S. patent application Ser. No. 12/492,713, incorporated herein by reference in its entirety, describes the structure and functionality of the AMCE 110. In an aspect, the AMCE 110 includes a ground station AMCE and an airborne AMCE. The structure and functionality of the AMCE 110 will be discussed in greater detail below with reference to FIG. 2.

In the embodiment according to FIG. 1, the ATS 112 is coupled to the truth data network 106 and the CSA 104. The ATS 112 is configured to interface a tactical or non-tactical sensor and/or effector or other tactical testbed to the overall system through the CSA 104. The CSA 104 enables the rest of the aerospace-ground integration testbed 100 to be compatible with the tactical or non-tactical sensors and/or effectors or other tactical testbeds. For example, the ATS 112 includes a high-fidelity radar warning receiver simulator. One of ordinary skill in the art would understand that a variety of real and/or virtual (e.g., modeled or simulated) sensors, effectors and/or testbeds may be included as the ATS 112.

In the embodiment according to FIG. 1, the DTS 114 is coupled to the CSA 104. The DTS 114, similar to the ATS 112, is configured to interface a software-enabled tactical sensor and/or effector or other testbed to the overall system through the CSA 104. The CSA 104 enables the rest of the aerospace-ground integration testbed 100 to be compatible with the tactical or non-tactical sensors and/or effectors or other tactical testbeds. For example, the DTS 114 includes software configured to allow an engineer to perform mission-level commands, develop and run system-level testing, and debug radar tactical software to be used on real platforms. One of ordinary skill in the art would understand that a variety of real and/or virtual (e.g., modeled or simulated) sensors, effectors and/or testbeds may be included as the DTS 112.

In the embodiment according to FIG. 1, the HMI 116 is coupled to the AMCE 110. The HMI 116 is isolated from truth data and receives sensed (e.g., perceived) data. For example, the HMI 116 is configured to generate and display visual data to an end user, and to receive mission-level commands from the end user.

In the embodiment according to FIG. 1, the passive database 118 is coupled to the truth data network 106. The passive database 118 is configured to be used to generate sensed data, modeled sensed data, truth data, and visual data. Generally, the passive database 118 includes data other than the sensed data, the modeled sensed data and the truth data (e.g., non-processed data). For example, the passive database 118 includes road maps, terrain information and topography, altitude information, or other standardized sets of information.

The ATS 112, the DTS 114, the HMI 116 and the truth data generator may provide visual data to be displayed. The truth data network 106, in addition to other communication and testbed messaging infrastructure, provide a communications scheme between the CSF 102, the CSA 104, the truth data generator 108, the AMCE 110, the ATS 112, the DTS 114, the HMI 116 and the passive database 118.

Figure 2:
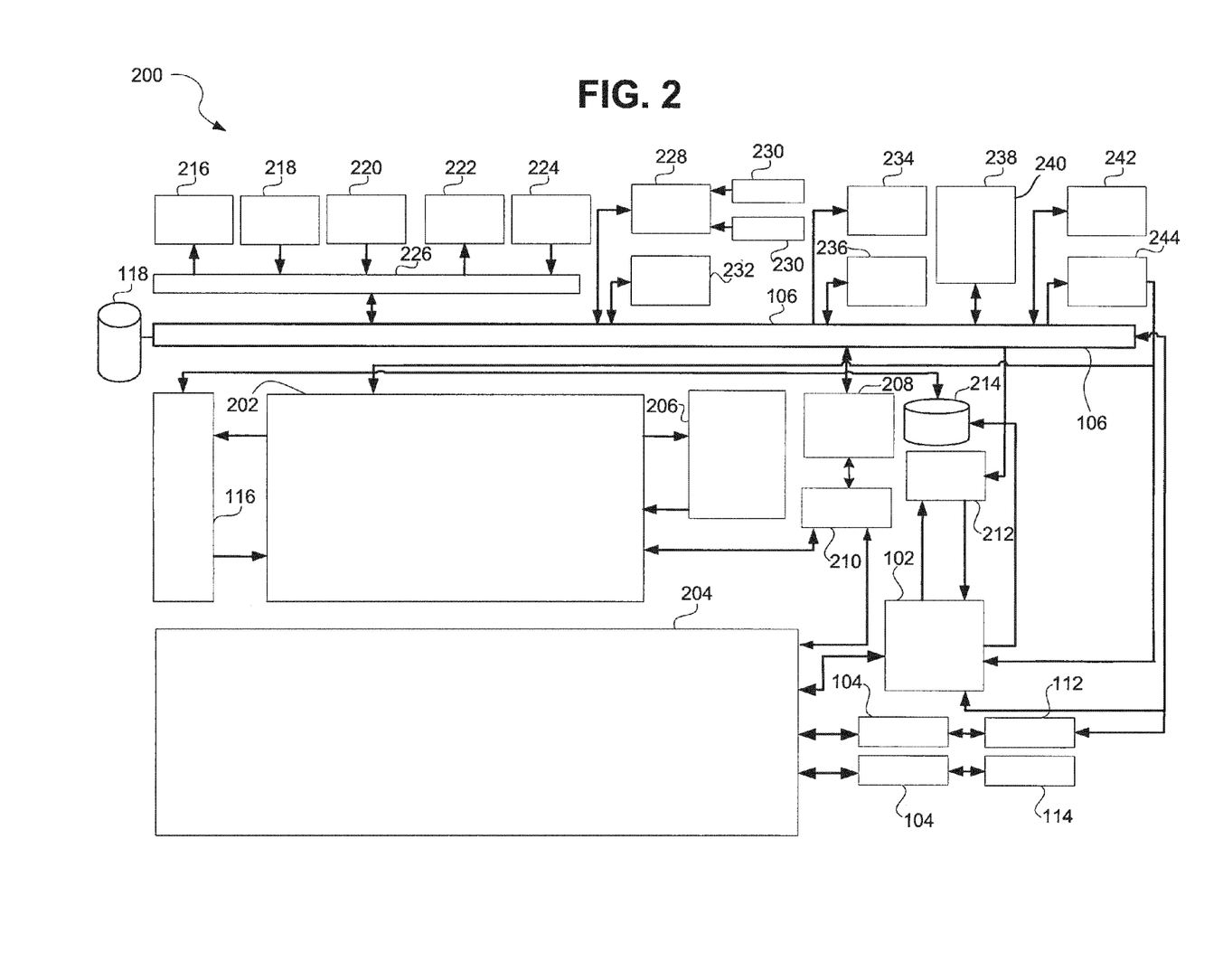
FIG. 2 is a schematic block diagram illustrating an aerospace-ground integration testbed in accordance with another embodiment of the present invention.

FIG. 2 is a schematic block diagram illustrating an aerospace-ground integration testbed 200 in accordance with another embodiment of the present invention.

Referring now to FIG. 2, the aerospace-ground integration testbed 200 in an embodiment includes a CSF 102, at least one CSA 104, a truth data network 106, an ATS 112, a DTS 114, an HMI 116, a passive database 118, a ground station AMCE 202, and an airborne AMCE 204. The aerospace-ground integration testbed further includes a distributive common ground station (DCGS) integration backbone (DIB) 206, a distributed communications evaluation model (DCEM) 208, a comms broker 210, an advanced tactical targeting technique (AT3) grader 212 and a video and images database 214.

In addition, while the aerospace-ground integration testbed 100 includes a truth data generator 108, the aerospace-ground integration testbed 200 may include truth data generators and non-truth data effectors, sensors and/or communications infrastructure. The aerospace-ground integration testbed 200 therefore includes a three-dimensional (3D) information station 216, a joint integrated mission model (JIMM) 218, a vehicle entity generator 220, a 2D information station 222, a one semi-automated forces (OneSAF) testbed 224, a translator application 226, a weapon model interface 228, at least one weapon model 230, a video and image generator 232, a data logger 234, a truth data network manager 236, a blue force entity generator 238, a radar and weapons simulator 240, a blue force location tracker 242, and a navigation information model 244.

In the embodiment according to FIG. 2, the CSF 102 is coupled to the truth data network 106, the airborne AMCE 204, the AT3 grader 212, the video and images database 214 and the navigation information model 242. The CSF 102 is configured to generate and transmit sensor tasks to the AT3 grader 212 and to generate modeled sensed data to be displayed by the aerospace-ground integration testbed 200. As described above with respect to FIG. 1, the CSF 102 receives truth data and/or passive data to generate the modeled sensed data (e.g., perceived data).

In the embodiment according to FIG. 2, the CSAs 104 are coupled to either the ATS 112 or the DTS 114, and to the airborne AMCE 204. The CSAs 104, for example, are configured to interface and adapt tactical software models and/or tactical software/hardware configurations to conduct "software in the loop" testing and/or modeling. Known tactical software such as tactical software for high-fidelity aircraft radar may be adapted to run in the system-of-systems environment.

In the embodiment according to FIG. 2, the truth data network 106, for example, is as described above with respect to FIG. 1. In greater detail, the truth data network is coupled to the CSF 102, the ATS 112, the DCEM 208, the AT3 grader 212, the translator application 226, the weapon model interface 228, the video and image generator 232, the data logger 234, the truth data network manager 236, the blue force entity generator 238, the radar and weapons simulator 240, the blue force location tracker 242 and the navigation information model 244. Via the translator application 226, the truth data network 106 is configured to receive data from the 3D information station 216, the IADS model 218, the vehicle module 220, the 2D information station 222 and the entity force generator 224. Via the weapon model interface 228, the truth data network 106 is configured to receive data from the at least one weapon model 230.

In the embodiment according to FIG. 2, the HMI 116 and the passive database 118 are substantially the same as described above with respect to FIG. 1. In greater detail, the HMI 116 is coupled to the video and images database 214.

In the embodiment according to FIG. 2, the ground station AMCE 202 is coupled to the CSF 102, the HMI 116, the DIB 206, and the comms broker 210. Via the comms broker 210, the ground station AMCE 202 is coupled to the airborne AMCE 204, the DCEM 208, and the truth data network 106. The ground station AMCE 202 is configured to collaboratively communicate and function with the airborne AMCE 204, which may be actual tactical software for operating an autonomous platform. For example, the autonomous platform is an unmanned airborne vehicle. The ground station AMCE 202 is further described below with respect to FIG. 3.

In the embodiment according to FIG. 2, the airborne AMCE 204 is coupled to the CSF 102, the CSAs 104 and the comms broker 210. Via the comms broker 210, the airborne AMCE 204 is coupled to the ground station AMCE 202, the DCEM 208 and the truth data network 106. As with the ground station AMCE 202, the airborne AMCE 204 is configured to collaboratively communicate and function with the ground station AMCE 202. The airborne AMCE 204 is further described below with respect to FIG. 3.

In the embodiment according to FIG. 2, the DIB 206 is coupled to the ground station AMCE 202. The DIB 206 is configured to provide communication between the ground station AMCE 202 and outside sources of information. For example, the DIB 206 includes a set of common interface standards and tools that allow seamless intelligence data sharing and collaboration across Battle Command or the C4ISR (e.g., concept of command, control, communications, computers, intelligence, surveillance and reconnaissance) enterprise of enterprises.

In the embodiment according to FIG. 2, the DCEM 208 is coupled to the truth data network 106 and the comms broker 210. Via the comms broker 210, the DCEM 208 is coupled to the ground station AMCE 202 and the airborne AMCE 204. The DCEM 208 is configured to simulate communication effects such as communications and bandwidth delays, and output delayed inter-platform messages.

In the embodiment according to FIG. 2, the comms broker 210 is coupled to the ground station AMCE 202, the airborne AMCE 204, and the DCEM 208. Via the DCEM 208, the comms broker 210 is coupled to the truth data network 106. The comms broker 210 is configured to provide testbed messaging infrastructure between the ground station AMCE 202 and the airborne platforms, including the airborne AMCE 204.

In the embodiment according to FIG. 2, the AT3 grader 212 is coupled to the CSF 102 and the truth data network 106. The AT3 grader 212 is configured to simulate signal intelligence (SIGINT) sensor effects. For example, the AT3 grader 212 receives sensor collection tasks and outputs sensor products, task status, sensor heartbeat and sensor capabilities.

In the embodiment according to FIG. 2, the video and images database 214 is coupled to the HMI 116, and is configured to provide EO and/or IR streaming video and images for display on the HMI 116.

In the embodiment according to FIG. 2, the 3D information station 216 is coupled to the translator application 226 and is a visualization tool designed to display 3D information. For example, the 3D information station 216 is a customizable 3D information station such as the MÄK Stealth from MÄK Technologies. The 3D information station 216 is configured to receive information about all entities and output 3D visual data for display. The 3D visual data may also be translated by the translator application 226 and made available to the aerospace-ground integration testbed 200 as truth data. For example, the 3D information station 216 generates Distributed Interactive Simulation (DIS)-compliant data.

In the embodiment according to FIG. 2, the IADS model 218 is coupled to the translator application 226 and is configured to generate simulated red force IADS (e.g., Integrated Air Defense System) data. IADS data includes textual and graphical information to be electronically displayed. The IADS model 218 is configured to generate red entity information to be translated by the translator application 226 and made available to the aerospace-ground integration testbed 200 as truth data. For example, an IADS model is the Joint Integrated Mission Model (JIMM) 218 which generates DIS-compliant data.

In the embodiment according to FIG. 2, the vehicle entity generator 220 is coupled to the translator application 226 and is configured to generate blue and red force entities. For example, the vehicle module 220 is a Tiger module (e.g., Tiger attack helicopter) configured to generate entity information to be translated by the translator application 224 and made available to the aerospace-ground integration testbed 200 as truth data. For example, the vehicle module 220 generates DIS-compliant data.

In the embodiment according to FIG. 2, the 2D information station 222 is coupled to the translator application 226 and is configured to receive information about all entities and generate 2D data to be displayed. For example, the 2D information station 222 is a MÄK Plan View Display (PVD) from MÄK Technologies.

In the embodiment according to FIG. 2, the entity force generator 224 is coupled to the translator application 226 and is configured to generate red and white force entities. The entity force generator 224 is configured to generate entity information to be translated by the translator application 226 and made available to the aerospace-ground integration testbed 200 as truth data. For example, the entity force generator 224 is the OneSAF testbed which generates DIS-compliant data.

In the embodiment according to FIG. 2, the translator application 226 is coupled to the 3D information station 216, the IADS model 218, the vehicle module 220, the 2D information station 222, the entity force generator 224 and the truth data network 106. For example, in an HLA truth data network environment, the data from the 3D information station 216, the IADS model 218, the vehicle module 220, the 2D information station 222 and the entity force generator 224 is translated from the DIS format to the HLA format.

In the embodiment according to FIG. 2, the weapon model interface 228 is coupled to the at least one weapon module 230 and the truth data network 106, and is configured to receive weapon information (e.g., simulated weapon information) from the at least one weapon module 230 and output weapon positions and state data on the truth data network 106 (e.g., truth data).

In the embodiment according to FIG. 2, the at least one weapon model 230 is coupled to the weapon model interface 228 and is configured to generate weapon information (e.g., simulated weapon information) and output the weapon information to the weapon model interface 228. For example, the at least one weapon model 230 may be an Archer missile, a Small Diameter Bomb (SDB) (e.g., GBU 40), and/or a Tomahawk missile.

In the embodiment according to FIG. 2, the video and image generator 232 may be coupled to the truth data network 106 and is configured to generate EO and/or IR video and image data to be displayed. The video and image generator 232 is configured to receive terrain data, video and imaging parameters, and output video and image data to be displayed. For example, the video and image generator 232 is Vega Prime from Presagis USA, Inc.

In the embodiment according to FIG. 2, the data logger 234 is coupled to the truth data network 106 and is configured to receive truth data network 106 messages, record the messages, and replay the messages upon command. For example, the data logger 234 is a MÄK Data Logger from MÄK Technologies.

In the embodiment according to FIG. 2, the truth data network manager 236 is coupled to the truth data network 106 and is configured to provide testbed network infrastructure to the aerospace-ground integration testbed 200. For example, the truth data network manager 236 is a set of common HLA federation services and network applications, such as an RTI-based federation tool.

In the embodiment according to FIG. 2, the blue force entity generator 238/radar and weapons simulator 240 is coupled to the truth data network 106 and is configured to generate blue force entities, and simulate radar and weapons models. For example, the blue force entity generator 238 is an Air Combat Evaluation Model (ACEM) configured to simulate manned aircraft, low fidelity X-band sensors and high fidelity air-to-air missile models, and the radar simulator 240 is a Search-While-Track Simulator (SWTSim) configured to simulate a high fidelity X-band electronically scanned antenna radar sensor.

In the embodiment according to FIG. 2, the blue force location tracker 242 is coupled to the truth data network 106 and is configured to receive blue force vehicle data and output tracking information about blue force entities to the truth data network 106. For example, the blue force location tracker 242 is a Platform Position Location Simulation (PPLI) that enables virtual blue entities to know the location of all other virtual blue entities in a battleground simulation.

In the embodiment according to FIG. 2, the navigation information model 244 is coupled to the truth data network 106 and the CSF 102 and is configured to simulate airborne platform navigation data (e.g., Inertial Navigation System (INS) data). The airborne platform navigation data is outputted as truth data on the truth data network 106 and is outputted to the CSF 102 to be used to generate sensed data or modeled sensed data.

While various features of the aerospace-ground integration testbed 200 have been discussed, one of ordinary skill in the art would understand that other variants of the aerospace-ground integration testbed 200 may be implemented depending on the type of testing that is desired. For example, while specific modules were described as producing DIS-compliant data or HLA-compliant data, many of these modules may be implemented to produce DIS-compliant or HLA-compliant data. In this case, for example, the 3D information station and/or the 2D information station may be implemented to produce HLA-compliant data.

Figure 3:
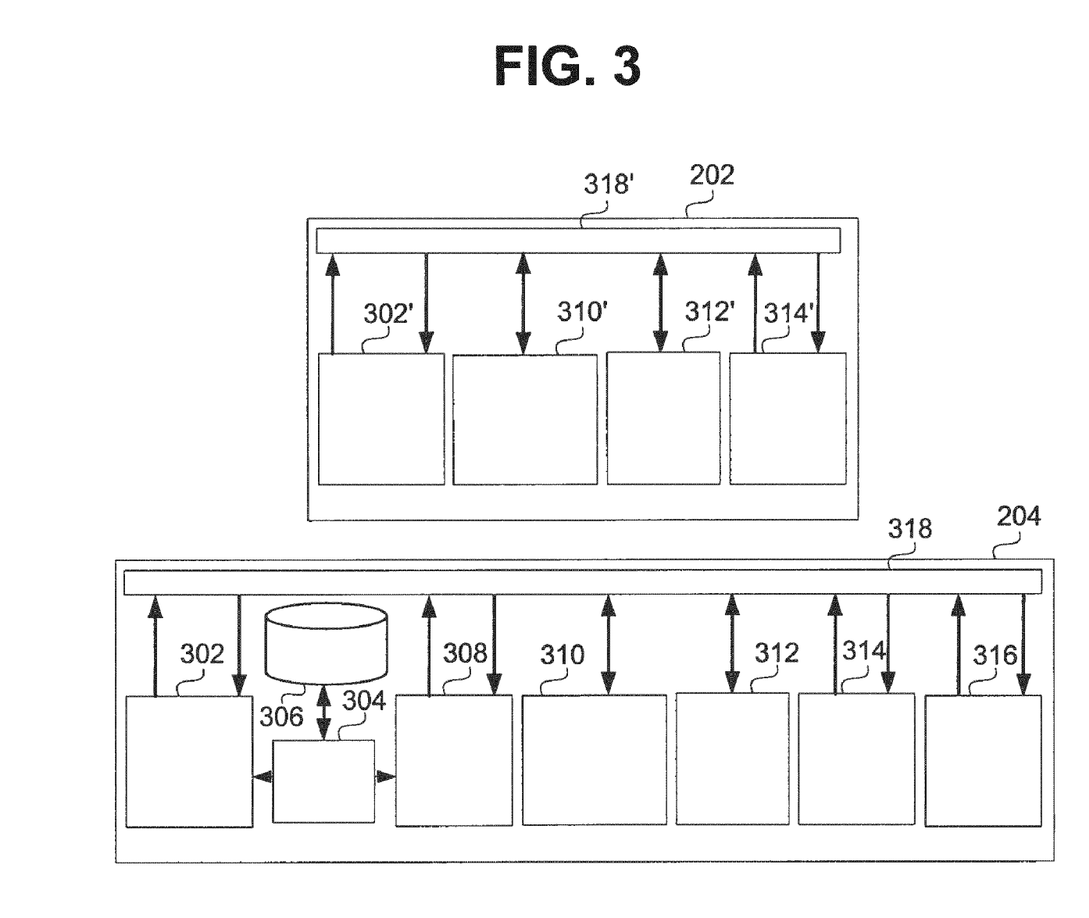
FIG. 3 is a schematic block diagram illustrating an advanced mission control element of an aerospace-ground integration testbed in accordance with an embodiment of the present invention.

FIG. 3 is a schematic block diagram illustrating an AMCE of an aerospace-ground integration testbed in accordance with an embodiment of the present invention;

Referring now to FIG. 3, the AMCE in an embodiment includes a ground station AMCE 202 and an airborne AMCE 204.

In the embodiment according to FIG. 3, the airborne AMCE 204 includes a mission manager 302, a data access layer 304, a sensor manager 306, a situational awareness manager 308, a platform control 310, a comms manager 312, an effects manager 314 and an enterprise service bus 316. The airborne AMCE 204 sends fused tracks, task status and platform capabilities to the ground station AMCE 202.

In the embodiment according to FIG. 3, the enterprise service bus 310 couples together and provides messaging infrastructure for the mission manager 302, the data access layer 304, the sensor manager 306, the situational awareness manager 308, the platform control 310, the comms manager 312 and the effects manager 314. For example, the enterprise service bus 310 is a Mule Enterprise Service Bus (ESB) from Mulesoft.org. In another embodiment, the Mule ESB is used in conjunction with Apache ActiveMQ. The enterprise service bus 310 is configured to define and execute the brokering of message exchanges between integrated software components. Apache ActiveMQ, for example, is a messaging provider that provides extensions for message brokering.

In the embodiment according to FIG. 3, the mission manager 302 is configured to automate system planning and execution functions on the airborne AMCE 204 such that human pilots and operators are not required to manually control individual systems of the airborne AMCE 204.

In the embodiment according to FIG. 3, the data access layer 304 is configured to provide access to the database 306. For example, the mission manager 302 and the sensor manager 308 have access to the AMCE database 306 through the data access layer 304.

In the embodiment according to FIG. 3, the database 306 is coupled to the data access layer 304 to provide data to the mission manager 302 and the sensor manager 308. The database 306 is configured to store and transmit tasks, routes and opportunities to the data access layer 304, which then distributes the tasks, routes and opportunities to the mission manager 302 and the sensor manager 308.

In the embodiment according to FIG. 3, the sensor manager 308 is coupled to the enterprise service bus 316 and the data access layer 304 and is configured to monitor and control sensors, plan and manage use of the sensor capabilities, and process and distribute sensing products. The sensor manager 308 is also configured to accept mission-level commands from the mission manager 302 and generate and schedule the activities of the sensors in response to the mission-level commands. The sensor manager 308 further receives data from the CSF 102 and the CSAs 104. In an embodiment, the sensor manager 308 is configured to re-plan mission-level tasks in real time. For example, in conjunction with other modules (e.g., the mission manager 302), the sensor manager 308 receives commands from a command station (e.g., the ground station AMCE 202), and in accordance with the received commands, adapts, re-tasks and re-plans a pre-planned mission plan. The sensor manager 308, in conjunction with other modules (e.g., the mission manager 302), also generates unmanned and autonomous vehicle data in accordance with the pre-planned mission plan and the received commands.

In the embodiment according to FIG. 3, the situational awareness manager 310 is configured to correlate all information available to the system to derive a cognitive understanding of the operational environment. The situational awareness manager 310 detects changes in the operational environment, such as weather, threats, system anomalies, and alerts the mission manager 302 to any changes.

In the embodiment according to FIG. 3, the platform control 310 is coupled to the enterprise service bus 316 and provides an AMCE infrastructure software suite to be utilized by the enterprise service bus 316.

In the embodiment according to FIG. 3, the comms manager 312 is coupled to the enterprise service bus 316 and is configured to collect cross-platform message instrumentation. The comms manager 312 manages the transfer of control and mission-level data within the platform and between the platform and external systems, provides communication infrastructure for the airborne AMCE 204, and enables flight and package coordination, command and control and reach back to decision makers.

In the embodiment according to FIG. 3, the effects manager 314 is coupled to the enterprise service bus 316 and is configured to manage all effectors on the airborne AMCE 204. For example, the effects manager 314 manages kinematic (e.g., weapons) and/or non-kinematic (e.g., jammers, Electronic Warfare) effectors on the airborne AMCE 204. One of ordinary skill in the art would understand that the effectors are virtualized and interact with the virtual environment of the aerospace-ground integration testbed.

In the embodiment according to FIG. 3, the ground station AMCE 202 receives autonomous platform data (e.g., unmanned and autonomous vehicle data) from the airborne AMCE 204, tasking commands from the HMI 116, Intelligence Preparation of the Battlefield (IPB) and/or imagery data from the DIB 206 and airborne platform navigation data from the navigation information model 244. The ground station AMCE 202 also receives fused tracks, task status and capabilities of the airborne AMCE 204. The ground station AMCE 202 is the ground station for the airborne AMCE 204.

In the embodiment according to FIG. 3, the ground station AMCE 202 includes a mission manager 302', a situational awareness manger 310', a platform control 312', a comms manager 314' and an enterprise service bus 318'. While the architecture of each of these components is similar to the analogous components in the airborne AMCE 204, these components are specifically designed for the ground station AMCE 202, which relays and coordinates control and re-tasking of mission-level commands.

In the embodiment according to FIG. 3, both the ground station AMCE 202 and the airborne AMCE 204 generate sensed data (e.g., perceived data) from the truth data (and other data). Conceptually, the aerospace-ground integration testbed is designed to supply the various modules, including the ground station AMCE 202 and the airborne AMCE 204, with only the data it would be supplied in a real battleground scenario.

Figure 4:
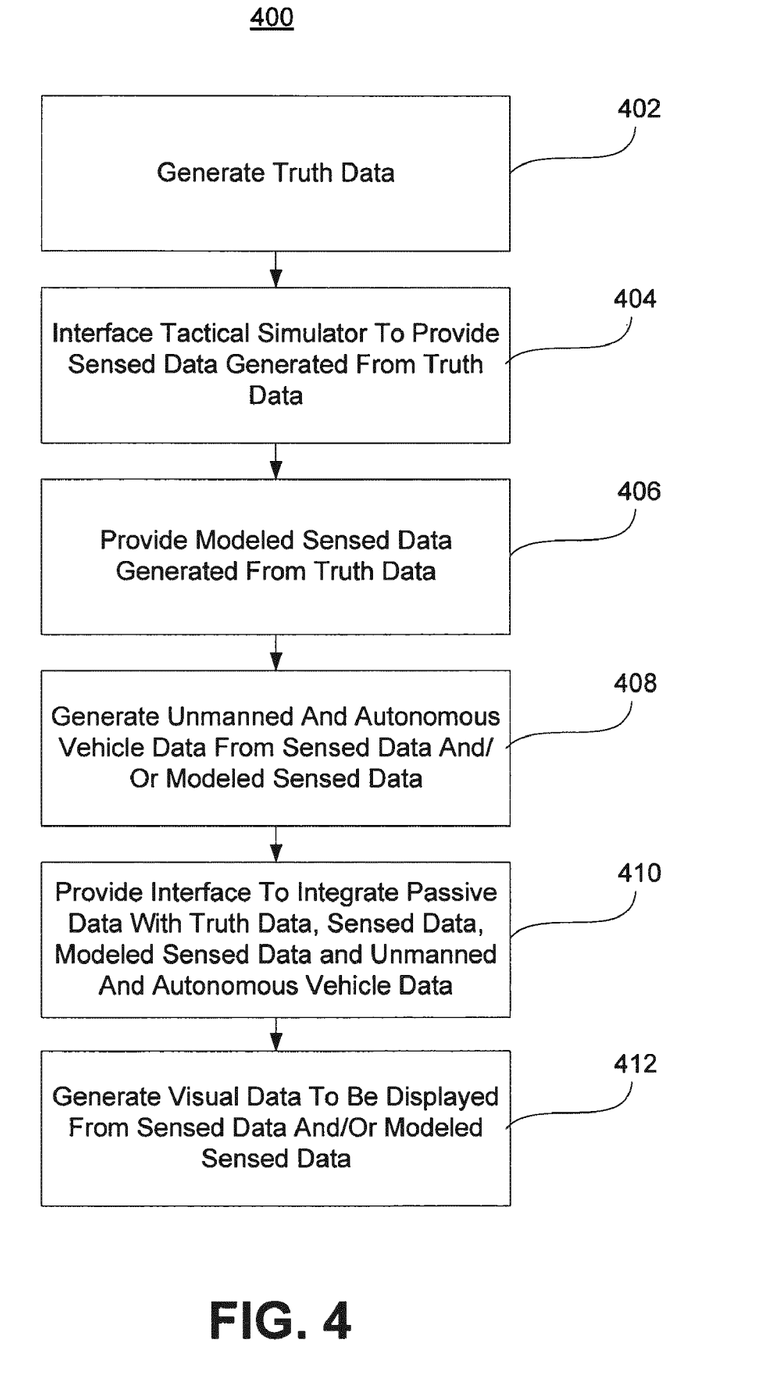
FIG. 4 is a flow diagram illustrating a method of using an aerospace-ground integration testbed in accordance with an embodiment of the present invention.

FIG. 4 is a flow diagram illustrating a method of using an aerospace-ground integration testbed in accordance with an embodiment of the present invention.

In the embodiment according to FIG. 4, at block 402, truth data is generated. The truth data provides data of threats, terrain, targets and offensive and defensive systems. The truth data is generated by a variety of generators, including the IADS model 218, the vehicle module 220, the entity force model 224, the at least one weapon model 230, the blue force entity generator 238, the radar and weapons simulator 240 and the blue force location tracker 242.

In the embodiment according to FIG. 4, at block 404, a tactical simulator is interfaced with the aerospace-ground integration testbed to provide sensed data generated from at least the truth data. For example, the tactical simulator is the ATS 112 (e.g., the advanced tactical simulator), which may generate sensed data. The tactical simulator may be a high-fidelity radar system testbed using all or partial tactical hardware and/or software. In another embodiment, the tactical simulator provides modeled sensed data. One of ordinary skill in the art would understand that various implementations of the testbed may be used depending on the testing desired. Depending on the hardware and/or software used, the tactical simulator may provide modeled sensed data or sensed data (e.g., data actually sensed by the high-fidelity radar system).

In the embodiment according to FIG. 4, at block 406, modeled sensed data is generated from at least the truth data. The tactical simulator interfaced with the aerospace-ground integration testbed may provide the modeled sensed data. In another embodiment, the modeled sensed data may be provided by the CSF 102, the DTS 114, the airborne AMCE 204 and/or the radar and weapons simulator 240.

In the embodiment according to FIG. 4, at block 408, unmanned and autonomous vehicle data is generated from at least one of the sensed data and/or the modeled sensed data. The unmanned and autonomous vehicle data may also be generated from the truth data via the comms broker 210 and the DCEM 208.

In the embodiment according to FIG. 4, at block 410, an interface is provided to integrate passive data with truth data, sensed data, modeled sensed data and unmanned and autonomous vehicle data. For example, the interface is the truth data network 106, the comms broker 210, the translator application 226 and other unspecified communications schema.

In the embodiment according to FIG. 4, at block 412, visual data is generated from the sensed data and/or the modeled sensed data. The visual data is to be displayed on a variety of service platforms, including the DTS 114, the HMI 116, the DIB 206, the 3D information station 216, the 2D information station 222, and the situational awareness manager 308. The visual data is used to output system of systems measure of performance and predictive data. For example, FIG. 5 is a diagram illustrating a battleground scenario modeled by an aerospace-ground integration testbed in accordance with an embodiment of the present invention.

Figure 5:
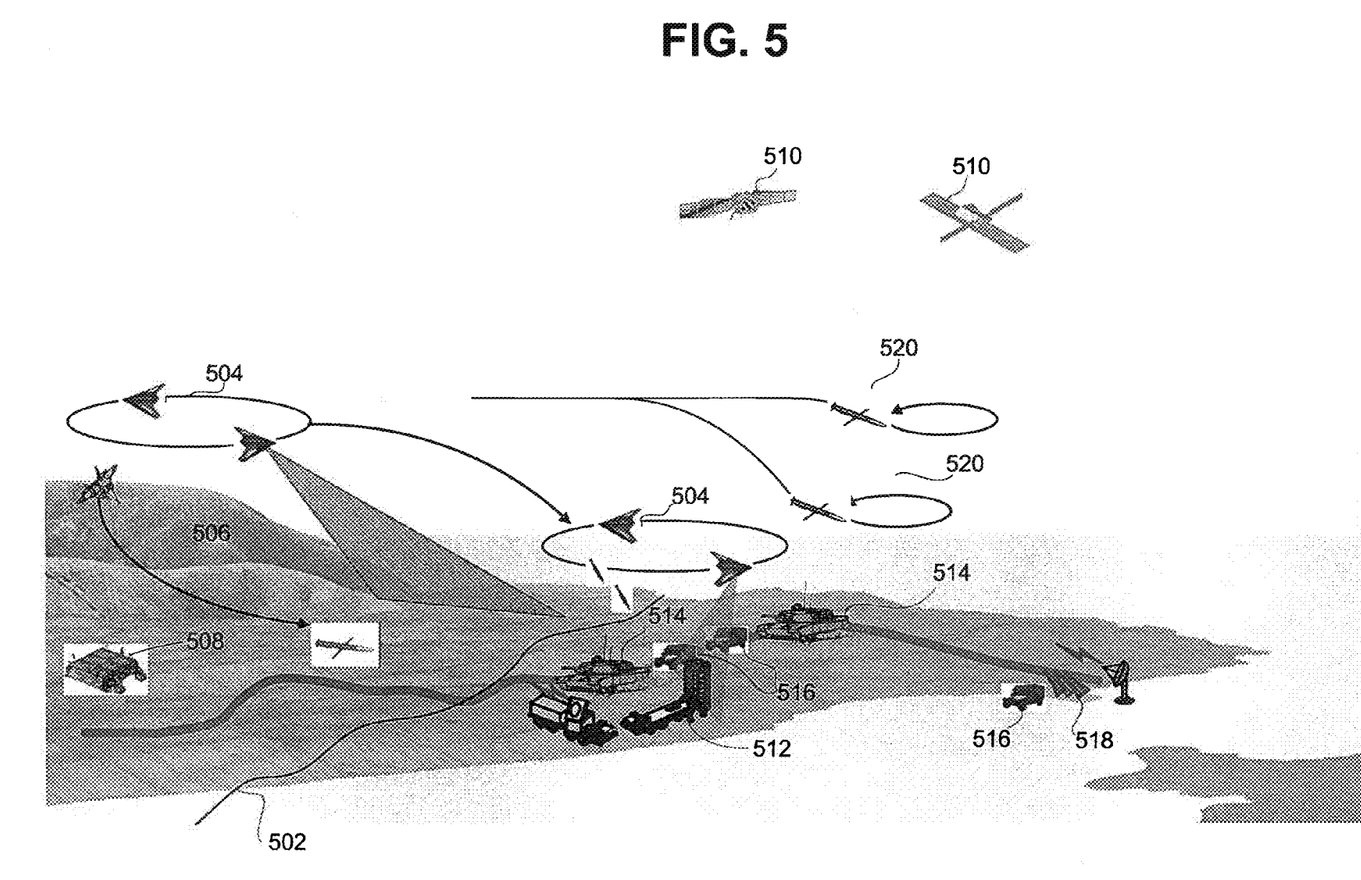
FIG. 5 is a diagram illustrating a scenario modeled by an aerospace-ground integration testbed in accordance with an embodiment of the present invention.

FIG. 5 depicts a battleground scenario including both red and blue force entities. Line 502 indicates the blue force "territory," on the left, and the red force "territory," on the right. The blue force entities include unmanned aerial vehicle (UAV) flights 504, a Joint Strike Fighter (JSF) 506, a DCGS 508, and satellites 510. The red force entities include CM (cruise missile) and SAM (surface-to-air missile) launchers 512, tanks 514, ground vehicles 516 and ground-launched cruise missiles (GLCMs) 518.

In the embodiment according to FIG. 5, the battleground scenario is a typical test simulation that may be performed using the aerospace-ground integration testbed. Such "net-centric" warfare involving multiple systems, platforms and scenarios enable a designer, end user or strategic authority to measure survivability, performance predictions involving actual or futuristic hardware and/or software, and end-to-end system measure of performance.

In the embodiment according to FIG. 5, in the battleground scenario, the DCGS 508 receives and relays IPB data indicating likely areas for CM and SAM launchers 512. During the entire engagement, the various blue force entities have full situational awareness of the battlespace while operating in denied airspace. At a time during the scenario, RF activity is detected from the CM and SAM launchers 512. The UAV flights 504 and the JSF 506 direct netted weapons 520 toward the target areas. Using the UAV flights 504, the JSF 506, the DCGS 508 and the satellites 510, all elements of the red force CM and SAM launchers 512, tanks 514, ground vehicles 516 and GLCMs 518 are detected, geo-located and identified. The battleground commanders then obtain consent to apply lethal force, and relay that consent to the various blue entities. In response to the consent order, the UAV flights 504 and the JSF 506 command the netted weapons 520 to attack the targets (e.g., the CM and SAM launchers 512). The blue entities then evaluate damage done to the targets.

One of ordinary skill in the art would understand that such a battleground scenario is only an example, and the specific scenario may be implemented depending on the testing requirements. For example, other types of entities performing in the air, ground, sea and space may be implemented.

Therefore, there is presented an aerospace-ground integration testbed including an integrated collection of hardware, high-fidelity system and subsystem software models, and unmanned systems, which provides system-of-systems trade studies, mission effectiveness figures of merit, Man-in-the-Loop experiments, benchmarking, performance predictions, real-time test activities and Monte Carlo analyses.

What is claimed is:

1. An aerospace-ground integration testbed, comprising:
   a truth data generator for generating truth data configured to provide data of at least one of threats, terrain, targets and offensive and defensive systems, by processing passive date stored unprocessed in a database;
   a common sensor adaptor for providing sensed data generated from at least the truth data utilizing tactical sensor software;
   a common sensor framework for providing modeled sensed data generated from at least the truth data utilizing sensor models;
   a visualization module for generating visual data to be displayed from the sensed data and the modeled sensed data;
   a communications module for providing communication and testbed messaging between the common sensor adaptor, the common sensor framework, the truth data generator, and the visualization module; and
   an advanced mission control module configured to receive the sensed data and the modeled sensed data and generate autonomous platform data for an unmanned vehicle, the autonomous platform data including dynamic vehicle behavior data and commands sent to the unmanned vehicle in response to external threats, wherein the advanced mission control module includes;
   a ground station module,
   an airborne module,
   a mission manager module configured to automate system planning and execution functions on the airborne module such that human operators are not required to manually control individual systems of the airborne module, and
   a sensor manager configured to accept mission-level commands from the mission manager, re-plan mission-level tasks in real time and generates unmanned and autonomous vehicle data in accordance with the pre-planned mission plan and the received commands, to be sent to the unmanned vehicle.

2. The aerospace-ground integration testbed of claim 1, further comprising:
   a human-machine interface configured to receive data and transmit mission-level commands via the communications module.

3. The aerospace-ground integration testbed of claim 1, wherein the database for storing passive data is configured to be used to generate at least one of the sensed data, the modeled sensed data, the truth data, and the visual data.

4. The aerospace-ground integration testbed of claim 1, wherein the passive data comprises data other than the truth data, the sensed data and the modeled sensed data.

5. The aerospace-ground integration testbed of claim 1, wherein the truth data comprises at least one sensor model.

6. The aerospace-ground integration testbed of claim 1, wherein the visualization module comprises at least one display.

7. The aerospace-ground integration testbed of claim 1, wherein the common sensor adaptor is configured to provide the modeled sensed data.

8. The aerospace-ground integration testbed of claim 6, further comprising:
   a tactical simulator coupled to the common sensor adaptor configured to generate the sensed data or the modeled sensed data.

9. The aerospace-ground integration testbed of claim 8, wherein the common sensor adaptor is configured to interface at least one tactical sensor module with the common sensor framework, the truth data generator, and the advanced mission control module.

10. The aerospace-ground integration testbed of claim 1, wherein the advance mission control module further comprises:
    an effects management scheme for providing launch and control commands to weapons and effector systems of the platform;
    a vehicle management scheme for providing vehicle control commands to vehicle control systems of the platform;
    a situational awareness management scheme for providing correlation of sensor data of the platform;
    a communications management scheme for providing coordination, command and control between the advanced mission control module, the platform, and systems external to both the advanced mission control module and the platform;
    an information management scheme for generating and distributing information pertaining to the autonomous platform data and intelligence of the advanced mission control module and the platform; and
    a middleware scheme for interfacing the sensor management scheme, the mission management scheme, the effects management scheme, the vehicle management scheme, the situational awareness management scheme, the communications management scheme, and the information management scheme.

* * * * *